(12) United States Patent
Cooper et al.

(10) Patent No.: US 8,382,633 B2
(45) Date of Patent: Feb. 26, 2013

(54) AXLE SHAFT DISCONNECT ASSEMBLY

(75) Inventors: Kenneth Cooper, Toledo, OH (US); James Krisher, Fort Wayne, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/544,972

(22) Filed: Jul. 9, 2012

(65) Prior Publication Data
US 2012/0277051 A1   Nov. 1, 2012

Related U.S. Application Data

(62) Division of application No. 12/192,451, filed on Aug. 15, 2008, now abandoned.

(51) Int. Cl.
*F16H 48/20* (2012.01)
(52) U.S. Cl. ......... 475/240; 180/247; 475/241; 475/231
(58) Field of Classification Search .................. 180/247; 475/231, 240, 241
See application file for complete search history.

(56) References Cited

U.S. PATENT DOCUMENTS

| | | | |
|---|---|---|---|
| 968,224 A | 8/1910 | Wolf | |
| 1,212,795 A | 1/1917 | Mayer et al. | |
| 1,243,720 A | 10/1917 | Eidson et al. | |
| 2,770,150 A | 11/1956 | Culverwell | |
| 3,142,203 A | 7/1964 | Bamford | |
| 4,271,722 A | 6/1981 | Campbell | |
| 4,625,584 A * | 12/1986 | Onodera | 475/160 |
| 4,630,506 A * | 12/1986 | Allmandinger et al. | 475/230 |
| 4,715,248 A | 12/1987 | Gant | |
| 5,030,181 A * | 7/1991 | Keller | 475/150 |
| 5,386,898 A | 2/1995 | Weilant et al. | |
| 5,591,098 A * | 1/1997 | Jones et al. | 475/231 |
| 5,996,720 A | 12/1999 | Hunt | |
| 6,079,539 A | 6/2000 | Fetcho et al. | |
| 6,318,533 B1 | 11/2001 | Krisher | |
| 6,540,634 B2 | 4/2003 | Thompson | |
| 6,634,978 B2 * | 10/2003 | Banno et al. | 475/222 |
| 7,096,990 B2 | 8/2006 | Borgen et al. | |

\* cited by examiner

*Primary Examiner* — David D Le
*Assistant Examiner* — Derek D Knight
(74) *Attorney, Agent, or Firm* — Marshall & Melhorn, LLC

(57) ABSTRACT

A drive axle assembly comprises a carrier member having a trunnion outwardly extending from the carrier member, an output shaft axially outwardly extending from the carrier member, a differential assembly including a differential case supported for rotation within the carrier member and a side gear rotatably mounted about the output shaft, a clutch collar non-rotatably coupled thereto and configured to selectively drivingly engage the side gear, and an annular clutch actuator for axially moving the clutch collar between a first position and a second position. The clutch collar drivingly engages the side gear in power transmitting relationship in the first position, while the clutch collar is disengaged from the side gear in the second position.

13 Claims, 12 Drawing Sheets

AXLE SHAFT DISCONNECT ASSEMBLY

RELATED APPLICATIONS

This application is a divisional application of and claims benefit from U.S. patent application Ser. No. 12/192,451, filed on Aug. 15, 2008, now abandoned the disclosure of which is incorporated in its entirety herein.

BACKGROUND OF THE INVENTION

1. Field of the Invention

This invention relates to vehicle axle assemblies in general, and more particularly, to an axle disconnect assembly for an auxiliary drive axle assembly of a four-wheel drive motor vehicle.

2. Description of the Prior Art

Four-wheel drive vehicles which are operable in either a two-wheel drive mode or a four-wheel drive mode are known as part time four wheel drive vehicles, are well known in the prior art. It is also known to provide the part time four wheel drive vehicle with an axle disconnect (or differential disconnect) mechanism in a front (or sometimes rear) axle assembly. Various axle disconnect assemblies or mechanisms have been proposed. These mechanisms in general have a number of moving parts, are fairly complex, and would be suitable only for installation on relatively wide vehicles because of the space required.

Such axle disconnect mechanisms typically include a fluid motor (hydraulic, pneumatic or vacuum) and a shift fork assembly. The fluid motor communicates with a fluid source that is usually controlled by a two position solenoid valve. The fork shift assembly under control of the fluid motor controls the axial shifting of a clutch collar between positions corresponding to coupled and uncoupled operating modes.

This conventional system has the drawback of an externally mounted actuator that requires considerable extra space particularly when vehicle suspension travel is taken into account. The use of an externally mounted actuator also necessitates the use of a fork shift assembly which adds to the cost and complexity of the prior art arrangement exemplified by this system. Moreover, such prior art axle disconnect systems do not provide a modular arrangement necessary for easy of manufacture, assembly and repair. Consequently these prior art arrangements are also complex and expensive to produce particularly when the difficulty of assembly is taken into account.

Moreover, the prior art axle designs typically include an axle shaft with male splines connected to a side gear bore with female splines, to prevent relative rotation and transmit torque. For beam axles (or rigid axles), shaft lateral movement is usually restrained by (A) the shaft bearing at the wheel end, or (B) a C-clip attached to the axle shaft inboard of the side gear. For independent axles, i.e. the axles allowing the relative motion (or travel) between the left-hand and right-hand outer axle shafts, the shaft lateral movement is usually restrained by a collapsing/expanding ring contained within grooves on the shaft O.D. and side gear bore I.D.; this method is utilized for independent axles to facilitate shaft connection to the axle during the vehicle build. To integrate axle disconnect mechanisms within an independent axle assembly, the prior art methodology of axle shaft retention is not satisfactory. C-clips and expanding rings cannot be used because the shaft and side gear must be capable of rotating independently in disconnect mode. The shaft cannot be retained exclusively at the wheelend, because the length of the shaft varies due to wheel travel and the inboard plunging CV joint. Therefore, a new mechanism is required to (A) retain the shaft within the axle assembly, and (B) permit shaft to side gear relative rotation.

The need therefore exists for an axle disconnect assembly and an axle shaft retention in an independent axle assembly that are simple in design, compact in construction and economical to package and manufacture.

SUMMARY OF THE INVENTION

The present invention provides an improved drive axle assembly for a motor vehicle, including an axle disconnect mechanism.

In one aspect, the present invention discloses the drive axle assembly comprising a carrier member including an outwardly extending trunnion having an opening therethrough, an output shaft axially outwardly extending from the carrier member through the opening in the trunnion, a differential assembly including a differential case supported for rotation within the carrier member and a side gear being rotatably mounted about the output shaft, a clutch collar disposed about the output shaft and non-rotatably coupled thereto and configured to selectively drivingly engage the side gear, and an annular clutch actuator mounted to the trunnion for axially moving the clutch collar between a first position in which the clutch collar drivingly engages the side gear and a second position in which the clutch collar is disengaged from the side gear.

In another aspect, the present invention discloses the drive axle assembly comprising a carrier member, an output shaft axially outwardly extending from the carrier member, a differential assembly including a differential case supported for rotation within the carrier member and a side gear being rotatably mounted about the output shaft, a drive sleeve rotatably mounted about the output shaft and non-rotatably coupled to the side gear, a clutch collar disposed about the output shaft and non-rotatably coupled thereto and configured to selectively drivingly engage the drive sleeve, and a clutch actuator for axially moving the clutch collar between a first position in which the clutch collar drivingly engages the drive sleeve and a second position in which the clutch collar is disengaged from the drive sleeve.

In yet another aspect, the present invention discloses the drive axle assembly comprising a carrier member, an output shaft axially outwardly extending from the carrier member, a differential assembly including a differential case supported for rotation within by the carrier member and a side gear being rotatably mounted about the output shaft, a shaft retention collar disposed about the output shaft between the side gear and said output shaft so that the side gear is rotatably mounted about the shaft retention collar, a clutch collar disposed about the output shaft and non-rotatably coupled thereto and configured to selectively drivingly engage the side gear, and an annular clutch actuator mounted to the trunnion for axially moving the clutch collar between a first position in which the clutch collar drivingly engages the side gear and a second position in which the clutch collar is disengaged from the side gear.

Therefore, the present invention provides a novel axle shaft disconnect assembly for a drive axle of a motor vehicle that utilizes conventional casting and machining processes for a carrier member, a differential case, and an axle shaft, thus significantly reducing capital and tooling requirements to implement for production.

BRIEF DESCRIPTION OF THE DRAWINGS

Other objects and advantages of the invention will become apparent from a study of the following specification when viewed in light of the accompanying drawings, wherein.

DESCRIPTION OF THE PREFERRED EMBODIMENTS

Figure 1:
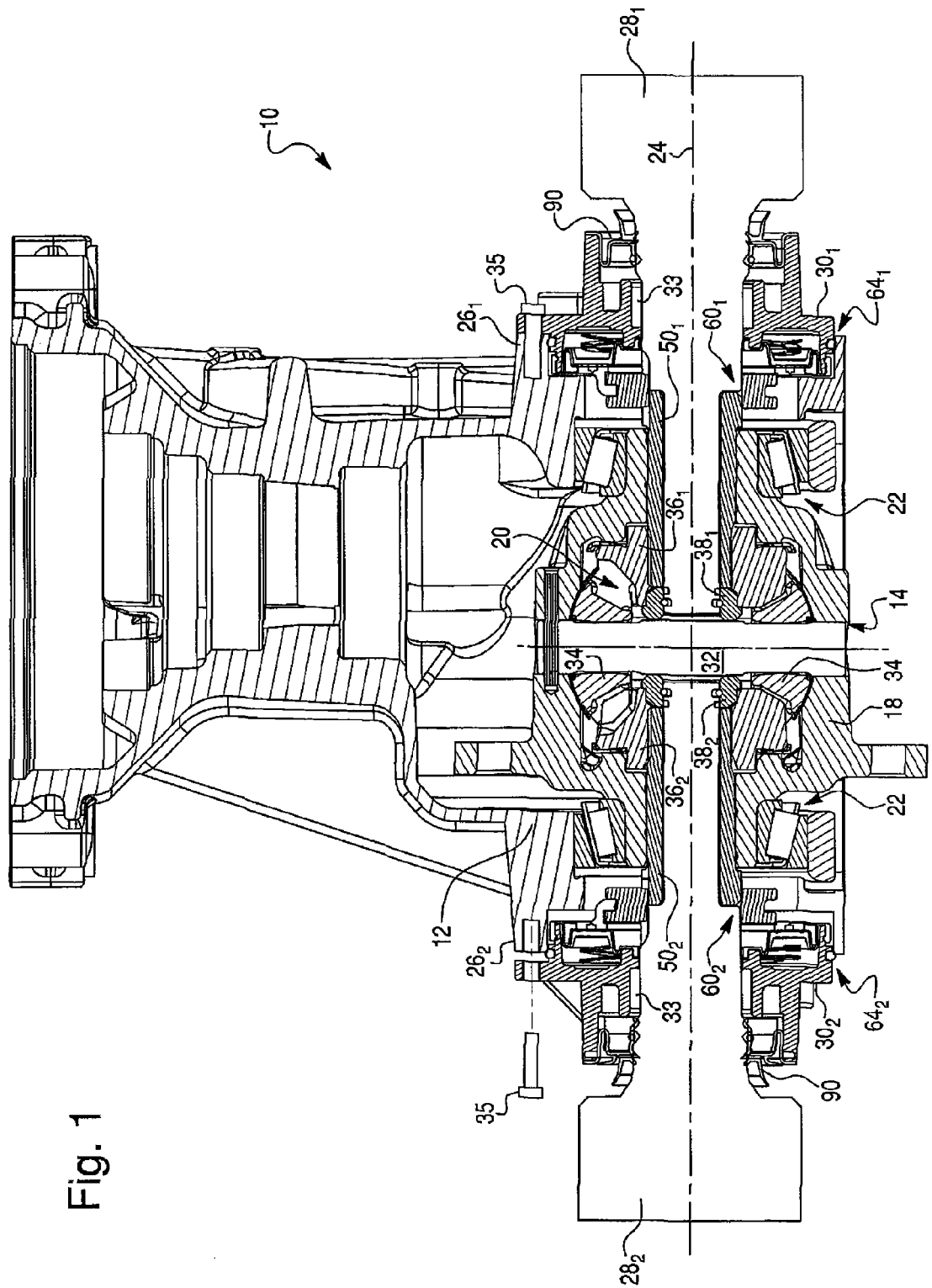
FIG. 1 is a cross-sectional view of a drive axle assembly according to a first exemplary embodiment of the present invention.
Figure 2:
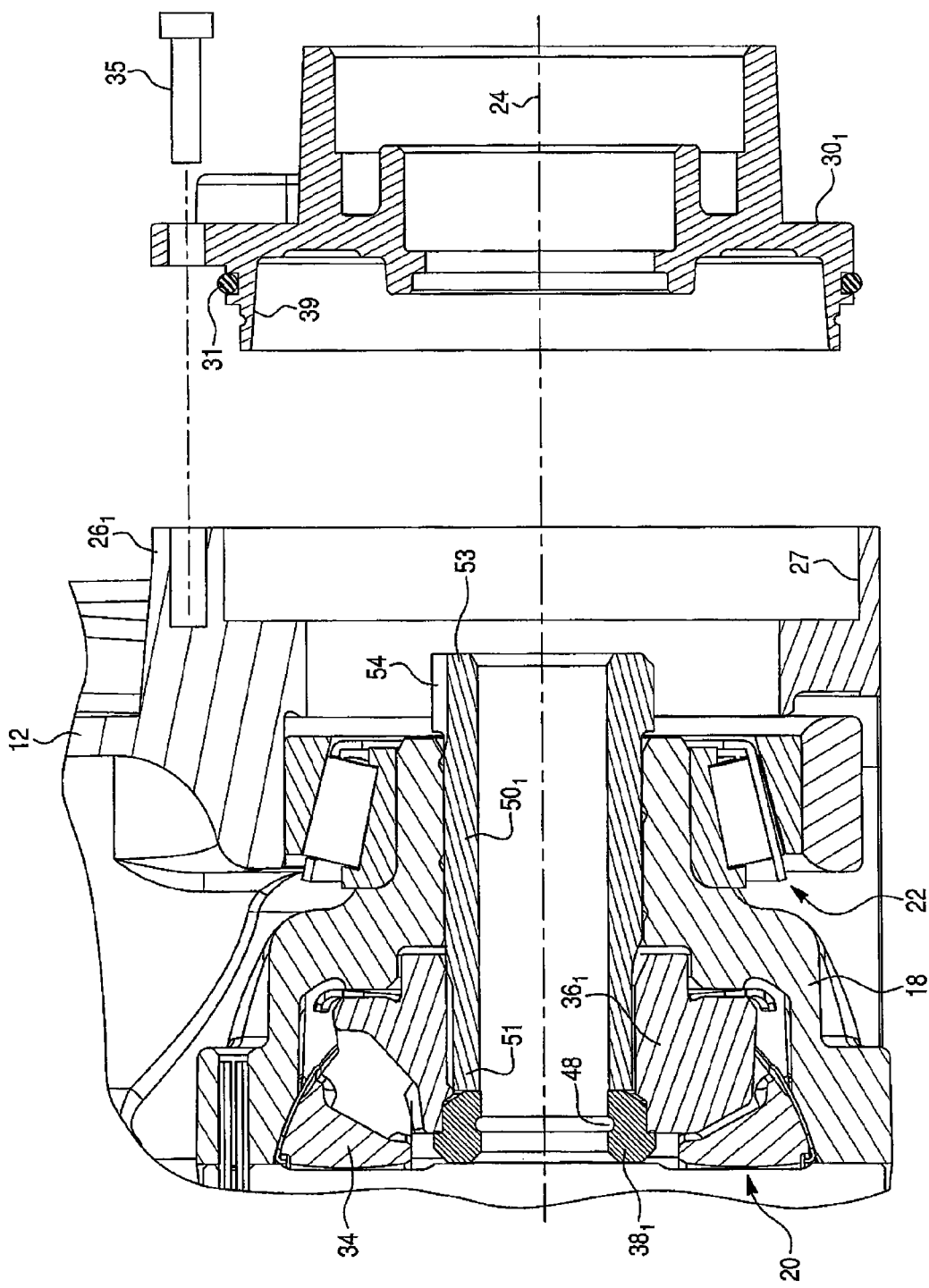
FIG. 2 is an exploded partial sectional view of the drive axle assembly according to the first exemplary embodiment of the present invention showing in detail a trunnion of a carrier member and an end plate.

The preferred embodiments of the present invention will now be described with the reference to accompanying drawing.

For purposes of the following description, certain terminology is used in the following description for convenience only and is not limiting. The words such as "front" and "rear", "left" and "right", "inboard" and "outboard", "inwardly" and "outwardly" designate directions in the drawings to which reference is made. The words "smaller" and "larger" refer to relative size of elements of the apparatus of the present invention and designated portions thereof. The terminology includes the words specifically mentioned above, derivatives thereof and words of similar import. Additionally, the word "a", as used in the claims, means "at least one".

Referring now to FIGS. 1-4 of the drawings, an auxiliary drive axle assembly according to a first exemplary embodiment of the present invention, generally denoted by reference numeral 10, includes a hollow carrier member 12 and a differential assembly 14 disposed within the carrier member 12 and driven by a pinion gear (not shown in FIG. 1). The differential assembly 14 includes a differential case 18 housing a differential mechanism (or gearing) 20. The differential mechanism, as it understood in the mechanical art and hereinbelow, is a system of gears capable of dividing the input torque of one input shaft between two output shafts where rotation at different speeds is likely to occur, as in cornering. The differential case 18 of the differential assembly 14 is rotatably supported within the carrier member 12 through conventional first (left) and second (right) differential antifriction bearings 22, which are preferably of the tapered roller bearing type, for rotation about a central axis 24 of the carrier member 12. The hollow carrier member 12 is preferably formed with various internal surfaces which support the components of the drive axle assembly 10. Specifically, the carrier member 12 includes first and second opposite trunnions $26_1$ and $26_2$, respectively, each having a generally cylindrical side opening 27 therethrough (shown in detail in FIG. 2) defining the central axis 24 of the carrier member 12. Each of the first and second trunnions $26_1$ and $26_2$ outwardly extends opposite to the other from the carrier member 12 in the direction of the central axis 24.

The drive axle assembly 10 further comprises first and second output axle shafts (or stub shafts) $28_1$ and $28_2$, respectively, coaxially outwardly extending from the side openings 27 through the respective first and second trunnions $26_1$ and $26_2$ of the carrier member 12 for rotation about the central axis 24. It will be appreciated that the first and second output shafts $28_1$ and $28_2$ outwardly extend from the differential case 18 substantially coaxially with the central axis 24 of the carrier member 12. The carrier member 12 further includes first and second opposite end caps $30_1$ and $30_2$, respectively, each fastened to the corresponding trunnions $26_1$ and $26_2$ of the carrier member 12 (such as by threaded fasteners 35) to close the openings 27 therein and is mounted about the corresponding output axle shaft $28_1$ or $28_2$ coaxially therewith. Moreover, each of the first and second end caps $30_1$ and $30_2$ is sealed within the corresponding trunnions $26_1$ and $26_2$ of the carrier member 12 by an O-ring 31. On the other hand, the first and second output axle shafts $28_1$, and $28_2$ rotatably support the corresponding first and second end caps $30_1$ and $30_2$ through antifriction roller bearings 33, such as needle bearings. Preferably, the first and second end caps $30_1$ and $30_2$ are substantially structurally identical.

Preferably, the drive axle assembly 10 according to the present invention is an independent drive axle assembly. It will be appreciated that in independent drive axle assembly (as opposed to a rigid drive axle assembly) the carrier member is mounted to a frame or body structure of the motor vehicle such that the deflection (or vertical travel) of one vehicle wheel is not directly transmitted to the carrier member. In other words, the independent drive axles allow the relative angular (or vertical) motion (or travel) between the left-hand and right-hand outer axle shafts. Specifically, the stub shafts $28_1$ and $28_2$ are drivingly coupled to left-hand and right-hand outer axle shafts (not shown) connected to the vehicle driving wheels, through suitable coupling means, such as constant-velocity (CV) joints (not shown) provided at the distal ends of the stub shafts $28_1$ and $28_2$. Typically, the independent drive axles are used in conjunction with independent suspensions.

The differential mechanism 20, disposed centrally within the differential case 18, includes a pinion (or cross) shaft 32 non-rotatably secured to the differential case 18, a pair of pinion gears 34 rotatably and coaxially disposed upon the pinion shaft 32 within the differential case 18, and first and second side gears $36_1$ and $36_2$, respectively. The first and second side gears $36_1$ and $36_2$ engage each of these pinion gears 34 and are disposed concentrically about the corresponding axle shafts $28_1$ and $28_2$, respectively. The differential mechanism 20 conventionally provides a differential rotation of the first side gear $36_1$ relative to the second side gear $36_2$. However, unlike the conventional differential assembly, each of the side gears $36_1$ and $36_2$ of the differential assembly 14 according to the present invention is rotatably mounted about the corresponding output shafts $28_1$ and $28_2$ through first and second shaft retention collars $38_1$ and $38_2$, respectively.

Figure 5:
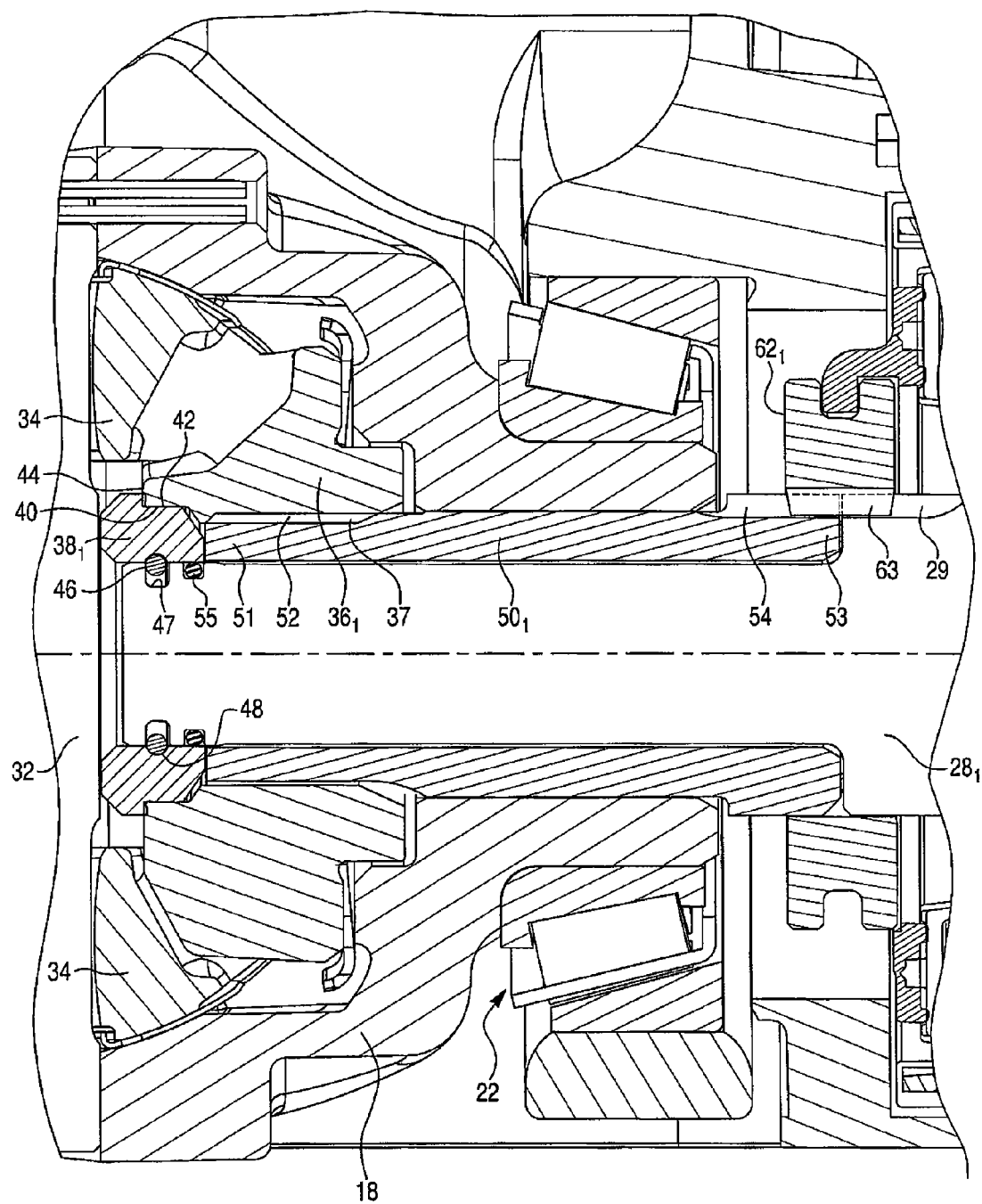
FIG. 5 is an enlarged partial sectional view of the drive axle assembly according to the first exemplary embodiment of the present invention showing in detail a side gear and a drive sleeve.

Referring now to FIG. 5 of the drawings, the mounting arrangement of the first side gear $36_1$ to an inward end of the first output shaft $28_1$ is illustrated in detail. It will be appreciated that preferably the mounting arrangements of the first and second side gears $36_1$ and $36_2$ to an inward end of the corresponding first and second output shafts $28_1$ and $28_2$ are substantially identical, as can be seen in FIG. 1. As illustrated in detail in FIG. 5, a cylindrical inner peripheral surface 40 of the first side gear $36_1$ is adapted to pilot a complementary cylindrical outer peripheral surface 42 of the first shaft retention collar $38_1$. The first shaft retention collar $38_1$ is restrained laterally in the direction of the central axis 24 between the differential pinion shaft 32 and an annular shoulder 44 of the first side gear $36_1$. When the inward end of the first output shaft $28_1$ is installed into the first shaft retention collar $38_1$, an expandable snap ring 46 locks the first output shaft $28_1$ to the first shaft retention collar $38_1$. As further shown in FIG. 5, the snap ring 46 is disposed in complementary annular grooves 47 and 48 formed in the first output shaft $28_1$ and the first shaft retention collar $38_1$, respectively. Moreover, an O-ring 55, preferably made of an appropriate elastomeric material, such as rubber, is mounted about the first output shaft $28_1$ so as to be compressed between the first shaft retention collar $38_1$ and the first output shaft $28_1$. The elastomeric O-ring 55 provides a frictional engagement between the first shaft retention collar $38_1$ and the first output shaft $28_1$ to restrain or prevent relative rotation between the first shaft retention collar $38_1$ and the first output shaft $28_1$, while ensuring relative rotation between the first side gear $36_1$ and the first shaft retention collar $38_1$. Preferably, the elastomeric O-ring 55 is disposed in an annular groove formed in the first output shaft $28_1$. This mechanism radially pilots the first output shaft $28_1$ in the first side gear $36_1$, permits relative rotation between the first output shaft $28_1$ and the first side gear $36_1$, and restrains the first output shaft $28_1$ within the carrier member 12.

The drive axle assembly 10 further comprises a first annular drive sleeve $50_1$ rotatably mounted about the first output shaft $28_1$ coaxially therewith and non-rotatably coupled to the first side gear $36_1$, and a second annular drive sleeve $50_2$ rotatably mounted about the second output shaft $28_2$ coaxially therewith and non-rotatably coupled to the second side gear $36_2$. Preferably, the first (right) and second (left) drive sleeves $50_1$ and $50_2$ are structurally identical, therefore only the drive sleeve $50_1$ is disclosed in details herein below. The drive axle assembly 10 also includes a first clutch (or disconnect) assembly $60_1$ provided for selectively drivingly disconnecting or connecting the first output shaft $28_1$ to or from the first side gear $36_1$, and a second clutch (or disconnect) assembly $60_2$ provided for selectively drivingly disconnecting or connecting the second output shaft $28_2$ to or from the second side gear $36_2$. Preferably, the first (right) and second (left) clutch assemblies $60_1$ and $60_2$ are substantially identical, both structurally and functionally (as shown in FIG. 1), therefore only one of the clutch assemblies $60_1$ and $60_2$ is disclosed in details herein below.

Figure 3:
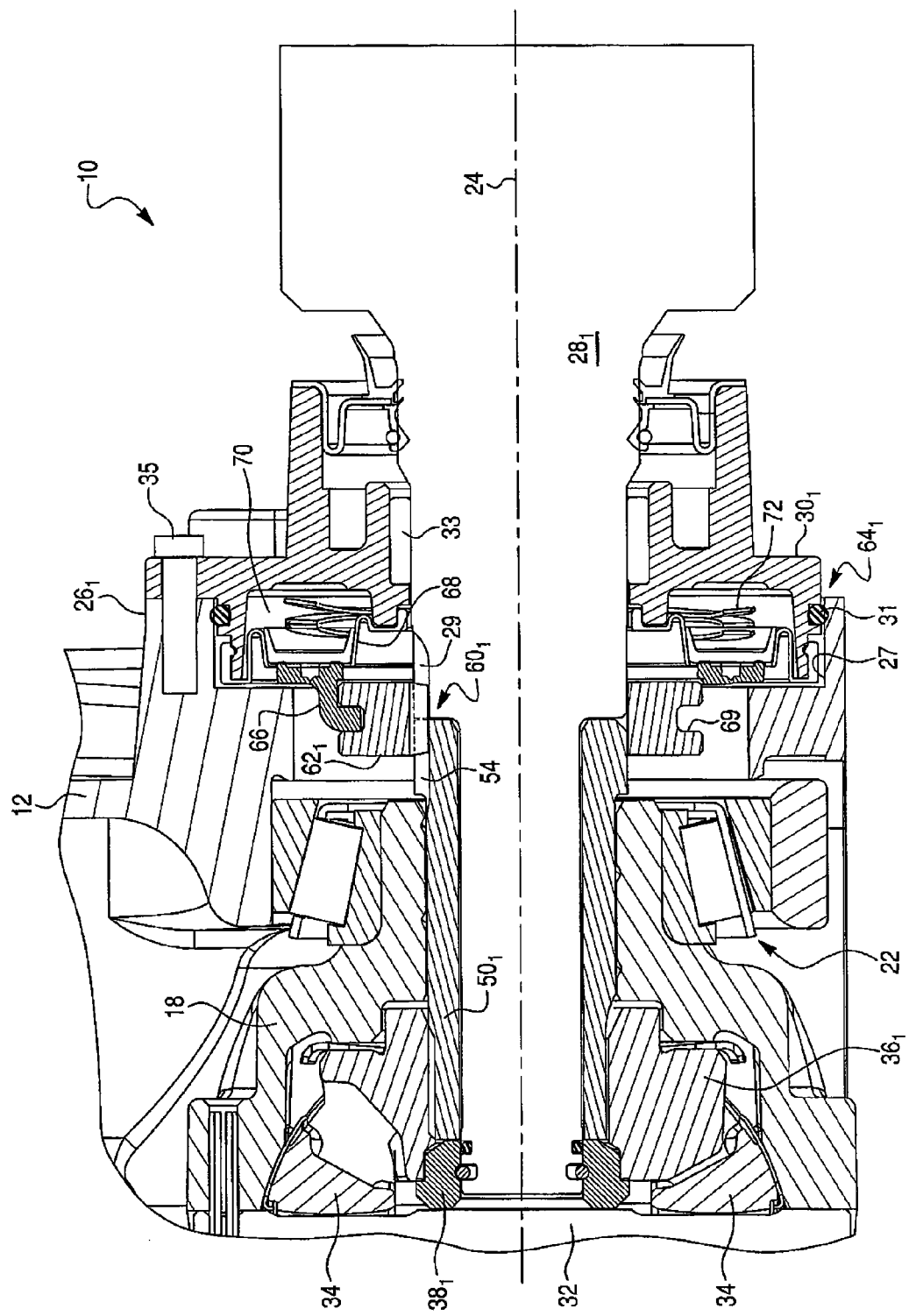
FIG. 3 is a partial sectional view of the drive axle assembly according to the first exemplary embodiment of the present invention in a first, engaged position.
Figure 4:
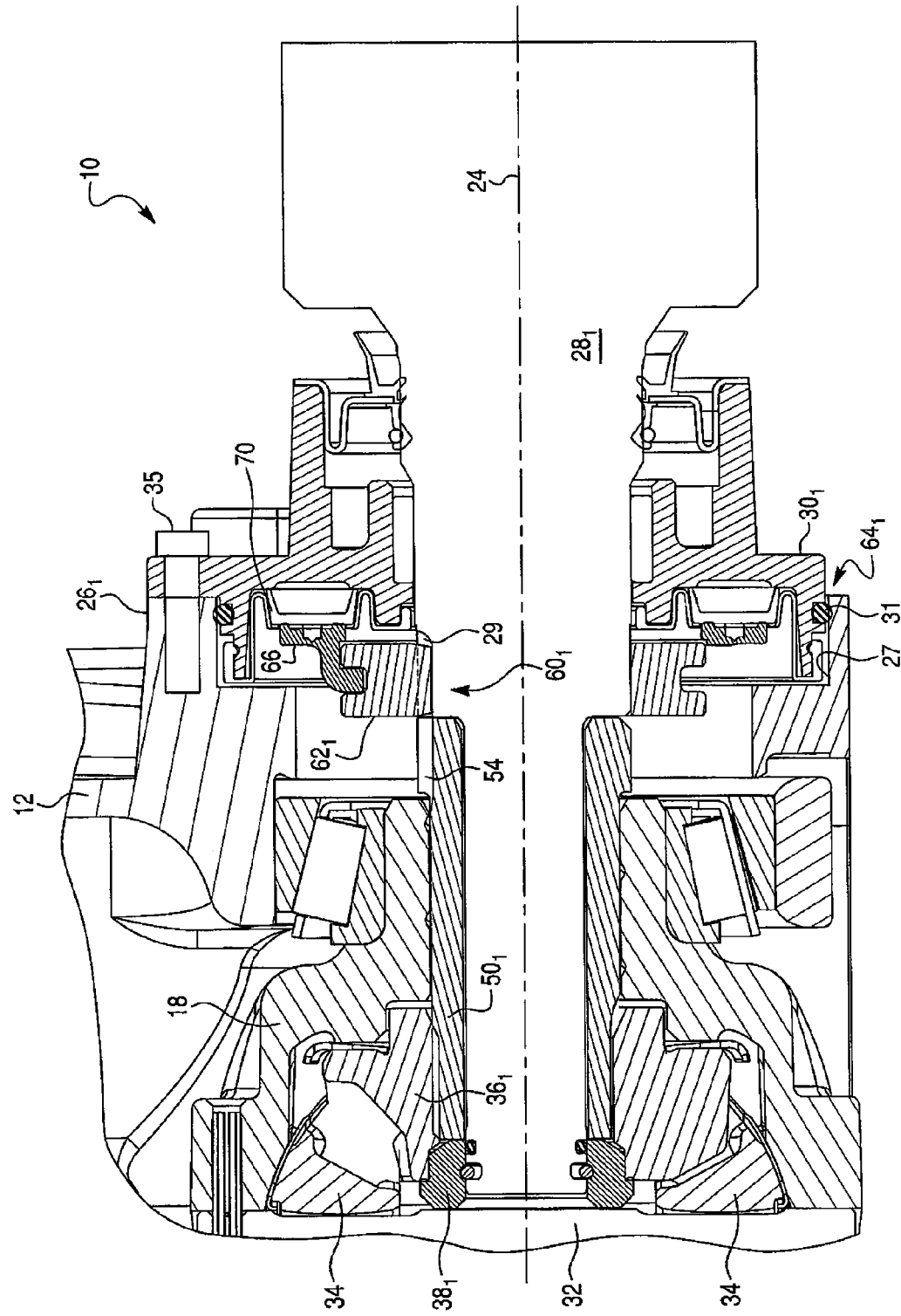
FIG. 4 is a partial sectional view of the drive axle assembly according to the first exemplary embodiment of the present invention in a second, disengaged position.

As illustrated in FIGS. 3-6, the first clutch assembly $60_1$ includes a first sliding clutch collar $62_1$ and a substantially annular first fluid-operated clutch actuator $64_1$ provided for axially driving (moving) the first clutch collar $62_1$ between a first, engaged position (or mode) (FIG. 3) and a second, disengaged position (or mode) (FIG. 4). Specifically, in the first position, the first clutch collar $62_1$ drivingly engages the first side gear $36_1$ in power transmitting relationship (as shown in FIG. 3), while in the second position, the first clutch collar $62_1$ is rotationally independent from the first side gear $36_1$. Preferably, the first clutch collar $62_1$ of the first clutch assembly $60_1$ is substantially identical to a second fluid-operated clutch actuator assembly $64_2$ of the second clutch assembly $60_2$. The first clutch collar $62_1$ is disposed concentrically about the first output shaft $28_1$. Moreover, the first clutch collar $62_1$ is non-rotatably but slideably coupled to the first output shaft $28_1$, such as by a spline connection. Specifically, as illustrated in detail in FIG. 6, the first clutch collar $62_1$ includes female splines 63 which mate with complementary male splines 29 formed on the first output shaft $28_1$. The mating female and male splines 63 and 29, respectively, permit axial motion of the first clutch collar $62_1$ relative the first output shaft $28_1$ while inhibiting relative rotational motion therebetween. Preferably, the first fluid-operated clutch actuator $64_1$ is a pneumatic actuator and may operate on pressurized air or, preferably, a vacuum to provide linear travel of the first clutch collar $62_1$. Actuators powered by hydraulic fluid, electricity or other means, which are axially drivable between the first and second modes are equally suitable for use with the instant invention.

The first drive sleeve $50_1$, shown in detail in FIG. 5, is rotatably mounted about the first output shaft $28_1$ concentrically therewith and is constantly non-rotatably (drivingly) coupled to the first side gear $36_1$, such as by a spline connection, so that the first clutch collar $62_1$ is configured to selectively drivingly engage the first side gear $36_1$ through the first drive sleeve $50_1$. More specifically, the first side gear $36_1$ has radially inwardly directed (or female) splines 37, while the first drive sleeve $50_1$ has first radially outwardly directed (or male) splines 52 complementary to and in mesh with the female splines 37 of the first side gear $36_1$ at an inner end 51 of the first drive sleeve $50_1$ and second radially outwardly directed (or male) splines 54 complementary to the female splines 63 of the first clutch collar $62_1$ at an outer end 53 of the first drive sleeve $50_1$. The mating male and female splines 54 and 63 of the first drive sleeve $50_1$ and the first clutch collar $62_1$, respectively, permit axial motion of the first clutch collar $62_1$ relative the first drive sleeve $50_1$.

In view of the above described similarities and in the interest of simplicity, the following discussion will sometimes use a reference numeral in brackets without a letter to designate each of two substantially identical structures of the first and second trunnions $26_1$ and $26_2$, the first and second output shafts $28_1$ and $28_2$, the first and second end caps $30_1$ and $30_2$, the first and second side gears $36_1$ and $36_2$, the first and second drive sleeves $50_1$ and $50_2$, the first and second clutch assemblies $60_1$ and $60_2$, the first and second clutch collars $62_1$ and $62_2$, and the first and second fluid-operated clutch actuator assemblies $64_1$ and $64_2$, etc. For example, the reference numeral [64] will be used when generically referring to both the first and second fluid-operated clutch actuator assemblies $64_1$ and $64_2$ rather than reciting two different reference numerals.

Figure 6:
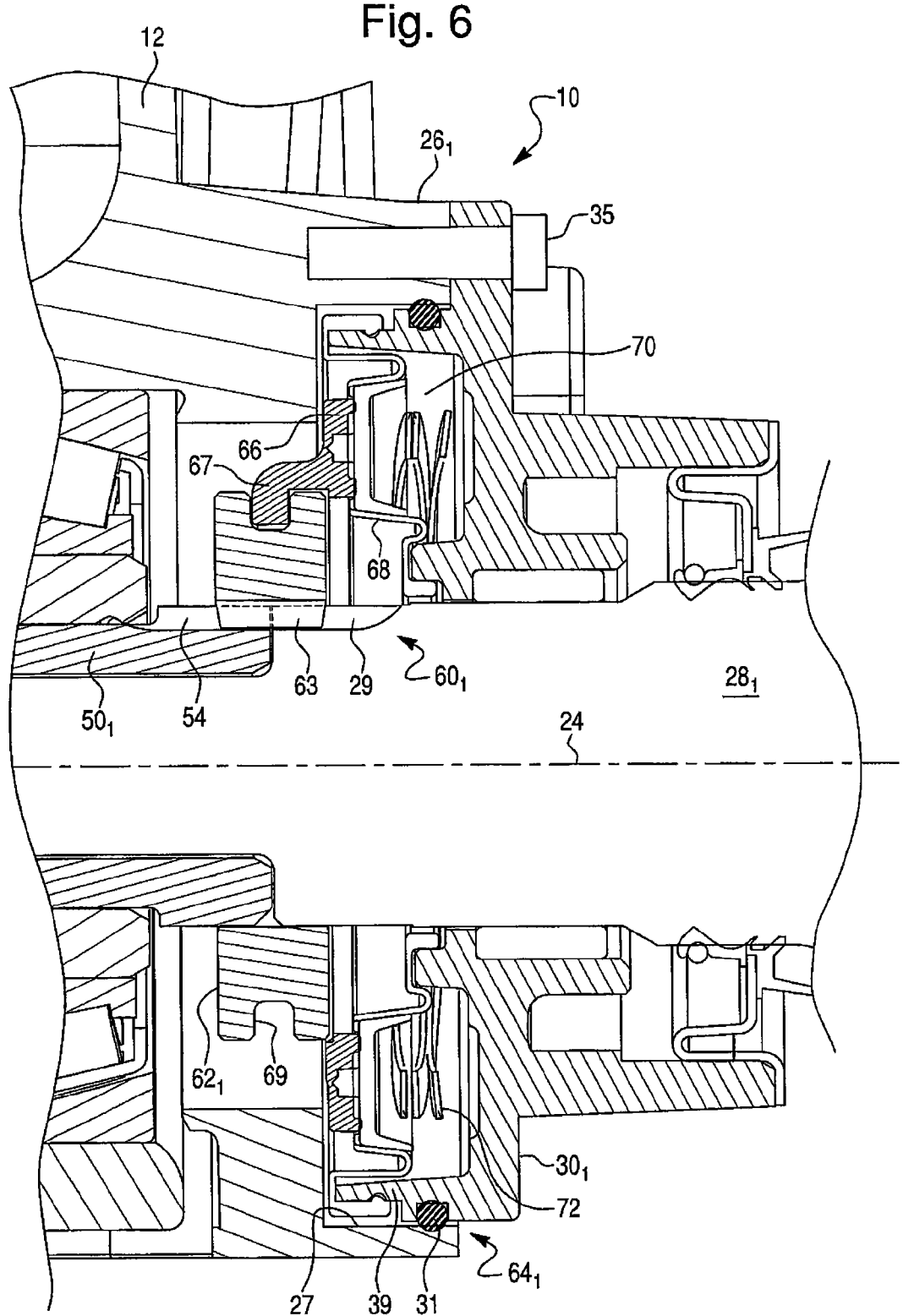
FIG. 6 is an enlarged partial sectional view of the drive axle assembly according to the first exemplary embodiment of the present invention showing in detail a fluid-operated clutch actuator.
Figure 7:
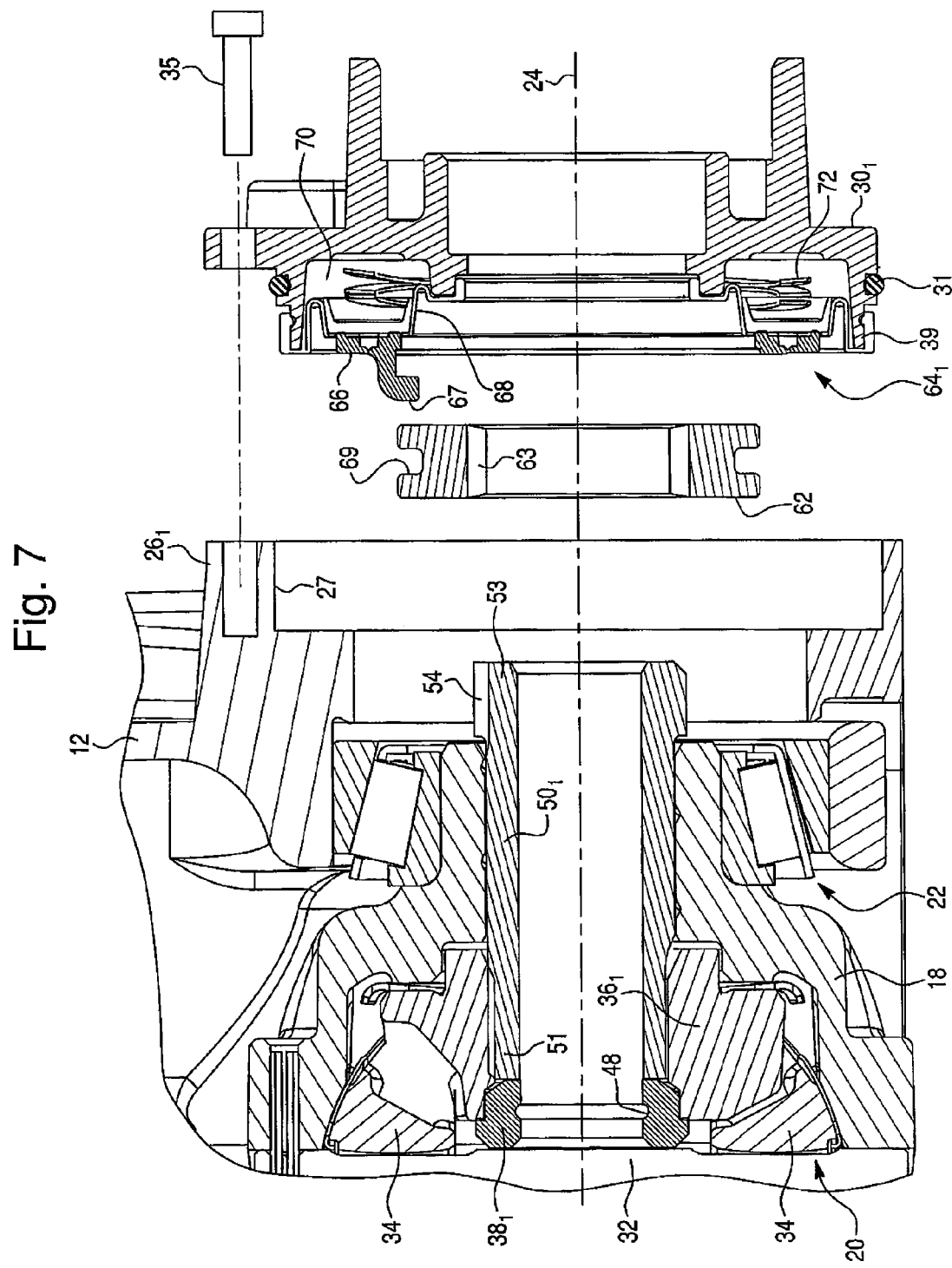
FIG. 7 is an exploded partial sectional view of the drive axle assembly according to the first exemplary embodiment of the present invention showing an integrated fluid-operated actuator/end cap assembly.

The vacuum-operated clutch actuator [64], illustrated in detail in FIG. 6, includes an annular actuator housing defined by the end cap [30] mounted to the trunnion [26], and an annular spring-biased actuator piston 66 at least partially disposed within the actuator housing [30] and sealingly connected to the actuator housing [30] through bellows 68. Both the annular actuator housing [30] and the annular actuator piston 66 of the vacuum-operated clutch actuator [64] are disposed about the output shaft [28] concentrically therewith. The end cap [30] is provided with an annular mounting flange 39 (also shown in FIG. 2) axially inwardly extending into the opening 27 in the trunnion [26] so as to define an open annular cavity in the end cap [30]. In turn, a space in the annular end cap [30] delimited by the mounting flange 39 thereof and the actuator piston 66, and sealed by the bellows 68 defines a fluid chamber (or, preferably, a vacuum chamber) 70 within the end cap [30]. Therefore, the first fluid-operated clutch actuator $64_1$ including the first end cap $30_1$ as an integral part thereof defines a first integrated fluid-operated actuator/end cap assembly. In other words, the end cap [30] acts as a housing of the vacuum-operated clutch actuator [64]. Similarly, the second fluid-operated clutch actuator $64_2$ including the second end cap $30_2$ as an integral part thereof defines a second integrated fluid-operated actuator/end cap assembly.

The vacuum-operated clutch actuator [64] further includes a spring member, such as a wave spring 72, disposed in the vacuum chamber 70 for normally biasing the actuator piston 66 toward the first, engaged position of the clutch collar [62]. The annular spring-loaded actuator piston 66 is provided with an actuator arm (or shift fork) 67 formed integrally with the actuator piston 66 to drivingly engage an annular groove 69 formed on a radially outer peripheral surface of the clutch collar [62] for axially moving the clutch collar [62] into and out of driving engagement with the drive'sleeve [50] and, consequently, with the side gear [36]. Preferably, the actuator piston 66 and the actuator arm 67 are made homogeneously as a single part member. The actuator arm 67 is designed to mate with the annular groove 69 in the clutch collar [62].

The vacuum chamber 70 of the vacuum-operated clutch actuator [64] communicates with a suitable external source of fluid pressure, such as an external vacuum source (not shown in FIGS. 1-6) via fluid passages (not shown in FIGS. 1-6) formed through the carrier member 28 and the actuator housing (end cap) [30], respectively, for connecting the vacuum-operated clutch actuator [64] to the external vacuum source such as the engine manifold through a control valve (not shown in FIGS. 1-4). The integrated actuator/end cap assembly [64] communicates with the external vacuum source via an external fitting (not shown in FIGS. 1-4) for connecting the vacuum-operated clutch actuator [64] to the external vacuum source. Moreover, the actuator housing [30] to axle shaft [28] sliding interface is sealed by a lip seal 90 non-rotatably mounted to the actuator housing [30].

Operation of the drive axle assembly 10 incorporating the disconnect assembly [60] according to the instant invention is best understood by reference to FIGS. 3 and 4.

When a vacuum is not applied in the vacuum chamber 70 of the vacuum-operated clutch actuator [64], the actuator piston 66 is shifted axially inward toward the side gear [36], as shown in the FIG. 3, by the spring member 72. Consequently, the actuator arm 67 of the actuator piston 66 moves the clutch collar [62] so that the female splines 63 of the clutch collar [62] mesh with (drivingly engage) the complementary male splines 54 of the drive sleeve [50], thus placing the disconnect assembly [60] in the first, engaged mode, as illustrated in FIG. 3, by drivingly engaging the side gear [36] with the output shaft [28]. Those skilled in the art would appreciate that in the engaged mode of the disconnect assembly 60, the side gear [46] is drivingly coupled to the output shaft [28] through the drive sleeve [50] and the clutch collar [62]. In this operational mode, torque can be transmitted from the side gear [36] to the output shaft [28].

When a vacuum is applied in the vacuum chamber 70 of the vacuum-operated clutch actuator [64], the actuator piston 66 is shifted axially outward away from the side gear [36] against the biasing force of the spring member 72. Consequently, the actuator arm 67 of the actuator piston 66 moves the clutch collar [62] so that the female splines 63 of the clutch collar [62] disengage from the complementary male splines 54 of the drive sleeve [50], thus placing the disconnect mechanism [60] in the second, disengaged mode, as illustrated in FIG. 4. Those skilled in the art would appreciate that in the disengaged mode of the disconnect mechanism [60], the side gear [36] is disconnected (disengaged) from the output shaft [28]. In the disengaged mode, the output shaft [28] is rotationally independent from the side gear [36] and the other components of the differential mechanism 40 and may freewheel independently of another output shaft [28]. Moreover, in disconnect mode, the side gear [36] may be stationary while the output shaft [28] rotates due to tire rotation.

It should be noted that the changeover from the engaged mode to the disengaged mode of the output shaft [28] or vice versa is quickly and conveniently accomplished remotely by means of an appropriate control system associated with the vacuum-operated clutch actuator [64]. The activating control for the vacuum-operated clutch actuator [64] may thus be located in a cab of the motor vehicle within the driver's reach.

Figure 8:
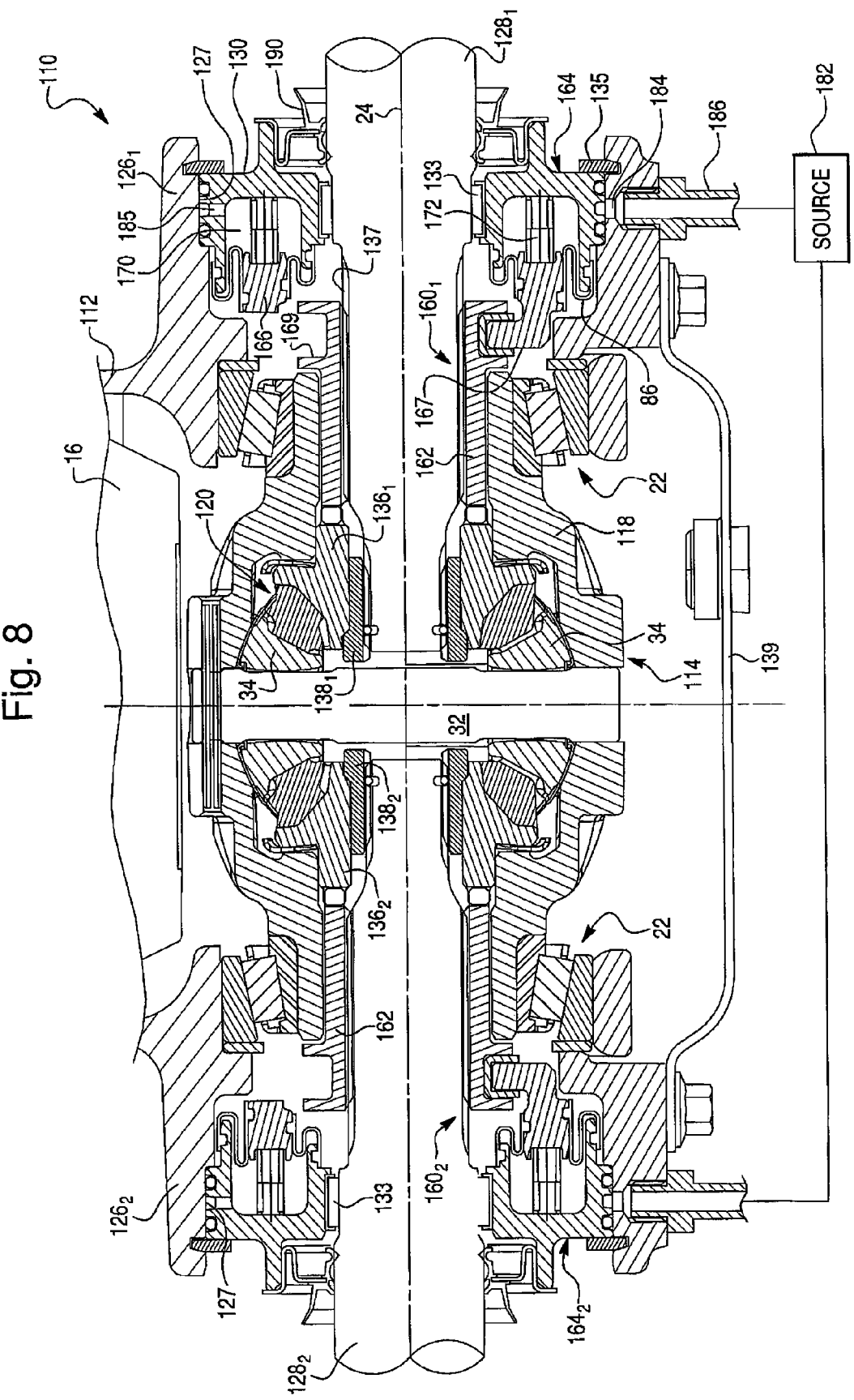
FIG. 8 is a cross-sectional view of a drive axle assembly according to a second exemplary embodiment of the present invention.
Figure 9:
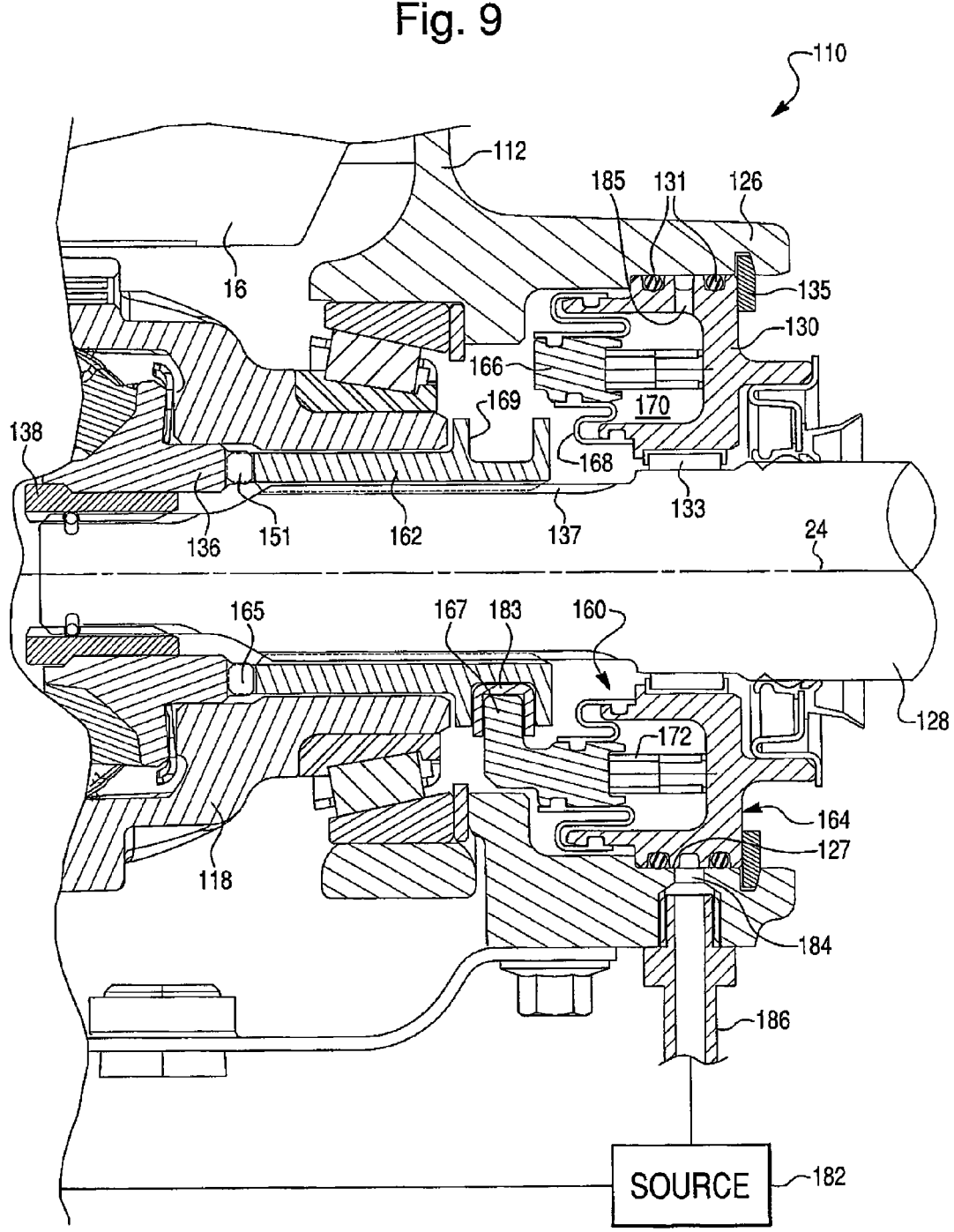
FIG. 9 is a partial sectional view of the drive axle assembly according to the second exemplary embodiment of the present invention in a first, engaged position.
Figure 10:
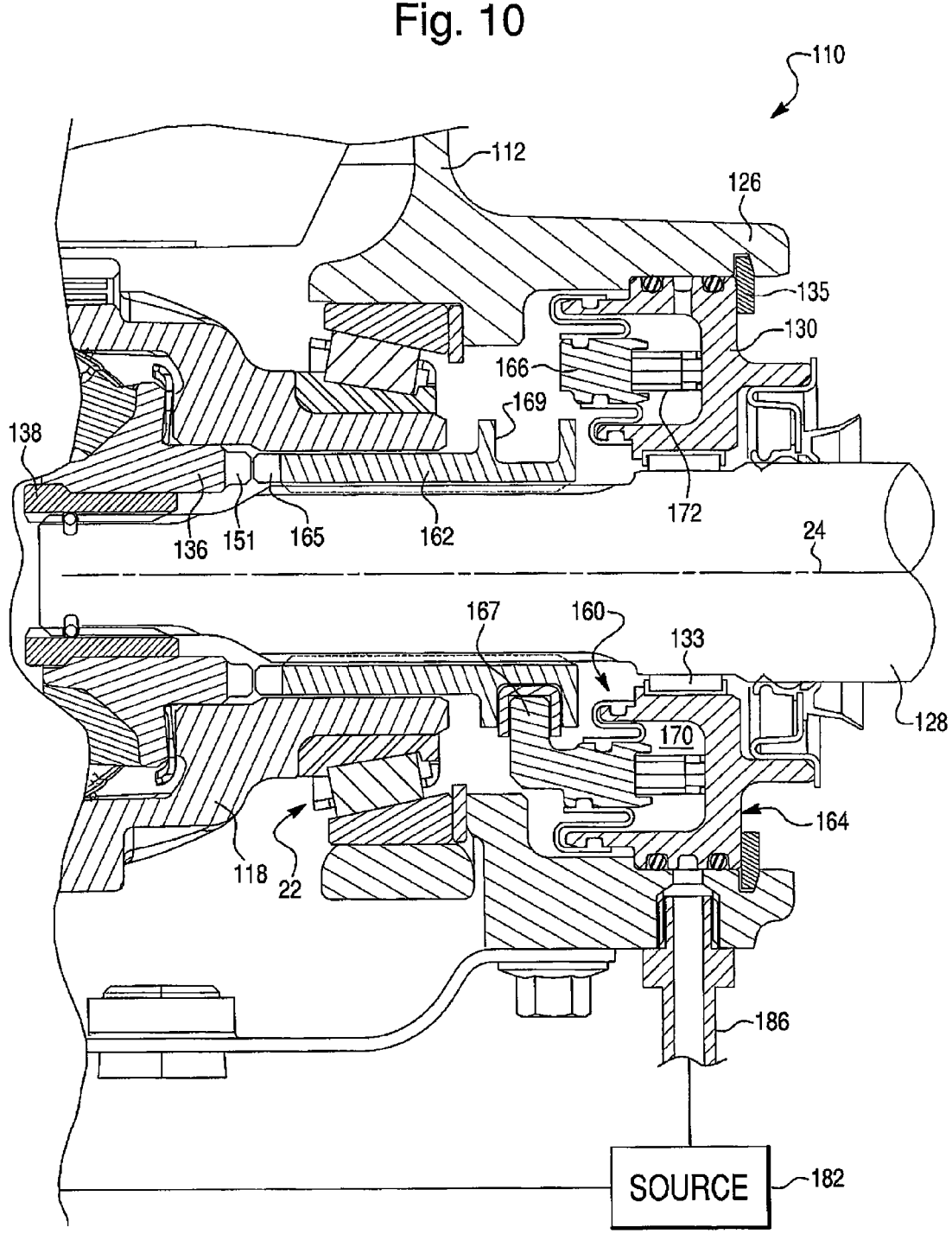
FIG. 10 is a partial sectional view of the drive axle assembly according to the second exemplary embodiment of the present invention in a second, disengaged position.

FIGS. 8-10 illustrate a drive axle assembly 110 according to a second exemplary embodiment of the present invention. Components, which are unchanged from the previous exemplary embodiments of the present invention, are labeled with the same reference characters. Components, which function in the same way as in the first exemplary embodiment of the present invention depicted in FIGS. 1-5 are designated by the same reference numerals to which 100 has been added, sometimes without being described in detail since similarities between the corresponding parts in the two embodiments will be readily perceived by the reader.

The drive axle assembly 110 according to the second exemplary embodiment of the present invention, shown in FIGS. 8-10, comprises a hollow differential carrier member 112 and a differential assembly 114 disposed within the carrier member 112 and driven by a pinion gear 16. A differential case 118 of the differential assembly 114 is rotatably supported within the carrier member 112 through conventional first (left) and second (right) differential anti-friction bearings 22, which are preferably of a tapered roller bearing type, for rotation about a central axis 24 of the carrier member 112. The hollow carrier member 112 is preferably formed with various internal surfaces which support the components of the drive axle assembly 110. Specifically, the carrier member 112 includes first and second opposite trunnions $126_1$ and $126_2$, respectively, each having a generally cylindrical side opening 127 therethrough defining the central axis 24 of the carrier member 112. Each of the first and second trunnions $126_1$ and $126_2$ outwardly extends from the carrier member 112 in the direction of the central axis 24.

The drive axle assembly 110 further comprises first and second output axle shafts $128_1$ and $128_2$, respectively, coaxially outwardly extending from the side openings 127 through the respective first and second trunnions $126_1$ and $126_2$ of the carrier member 112 for rotation about the central axis 24. It will be appreciated that the first and second output shafts $128_1$ and $128_2$ outwardly extend from the differential case 18 substantially coaxially with the central axis 24 of the carrier member 112.

Disposed centrally within the differential case 18 is a differential mechanism (or gearing) 120. The differential mechanism 120 includes a pinion (or cross) shaft 32 secured to the differential case 18, a pair of pinion gears 34 rotatably and coaxially disposed upon the pinion shaft 32 within the differential case 18, and first and second side gears $136_1$ and $146_2$, respectively. The first and second side gears $136_1$ and $136_2$ engage each of these pinion gears 34 and are disposed concentrically about the corresponding axle shafts $128_1$ and $128_2$, respectively. The differential mechanism 120 conventionally provides a differential rotation of the first side gear $136_1$ relative to the second side gear $136_2$. However, unlike the conventional differential assembly, each of the side gears $136_1$ and $136_2$ of the differential assembly 114 according to the present invention is rotatably mounted about the corresponding output shafts $128_1$ and $128_2$ through first and second shaft retention collars $138_1$ and $138_2$, respectively. It will be appreciated that preferably the mounting arrangements of the first and second side gears $136_1$ and $136_2$ to the corresponding first and second output shafts $128_1$ and $128_2$ are substantially identical, as shown in FIG. 8. The carrier member 112 also includes appropriately located access opening conventionally sealed by removable cover 139 (shown in FIG. 8).

In the interest of simplicity, the following discussion will sometimes use a reference numeral in brackets without a letter to designate each of two substantially identical structures of the first and second trunnions $126_1$ and $126_2$, the first and second output shafts $128_1$ and $128_2$, the first and second side gears $136_1$ and $136_2$, first and second shaft retention collars $138_1$ and $138_2$ and other pairs of identical components of the drive axle assembly 110. For example, the reference numeral [136] will be used when generically referring to both the first and second side gears $136_1$ and $136_2$, rather than reciting two different reference numerals.

Figure 11:
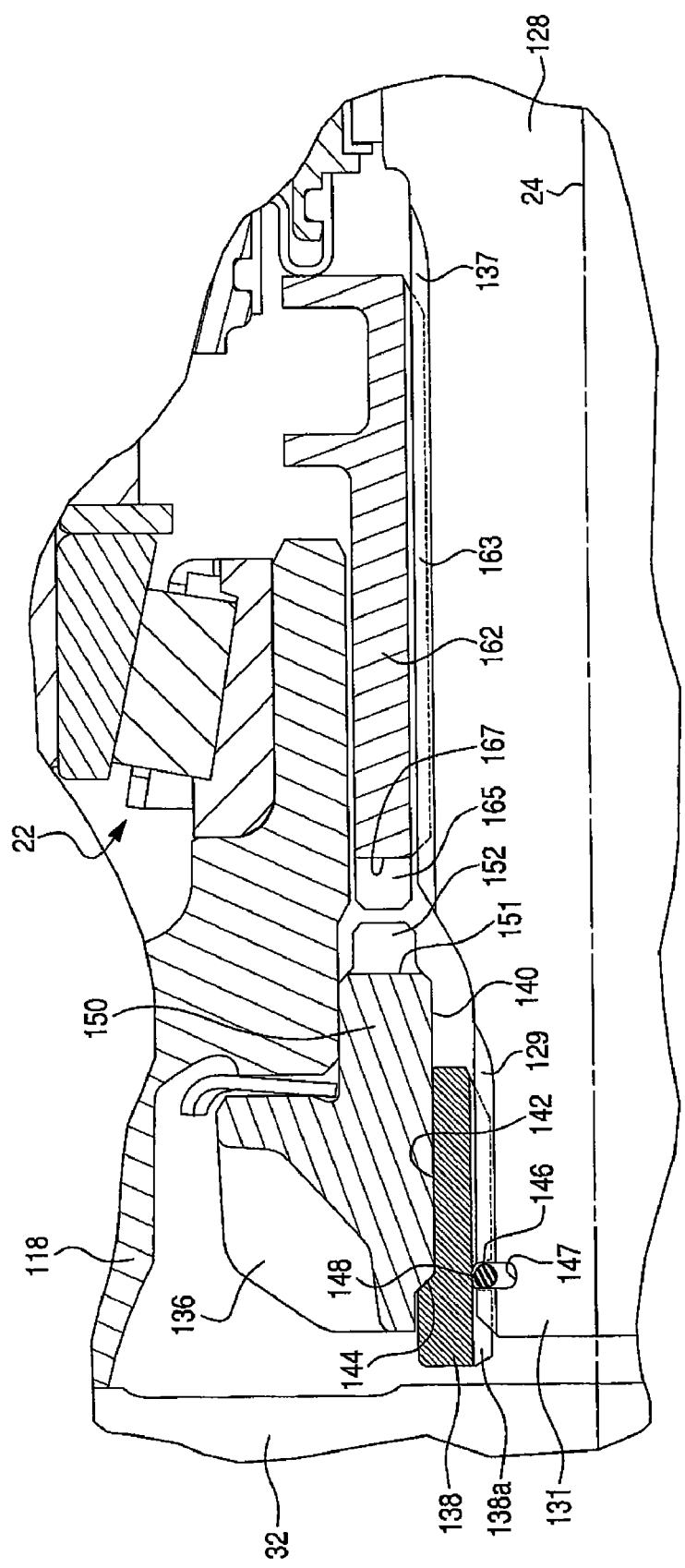
FIG. 11 is an enlarged partial sectional view of the drive axle assembly according to the second exemplary embodiment of the present invention showing in detail a side gear and a clutch collar.

Referring now to FIG. 11 of the drawings, the mounting arrangement of the side gear to an inward end 131 of the output shaft [128] is illustrated in detail. As illustrated in FIG. 11, the shaft retention collar [138] is provided with inner (or female) splines 138a complementary to outer (or male) splines 129 provided at the inward end 131 of the output shaft [128]. When assembled, the male splines 129 of the output shaft [128] drivingly engage the female splines 138a of the shaft retention collar [138]. A cylindrical inner peripheral surface 140 of the side gear [136] is adapted to pilot a complementary cylindrical outer peripheral surface 142 of the shaft retention collar [138]. The shaft retention collar [138] is restrained laterally in the direction of the central axis 24 between the differential pinion shaft 32 and an annular shoulder 144 of the side gear [136]. When the inward end 131 of the output shaft [128] is installed into the shaft retention collar [138], an expandable snap ring 146 locks the output shaft [128] to the shaft retention collar [138]. As shown in FIG. 8, the snap ring 146 is disposed in complementary annular grooves 147 and 148 formed in the output shaft [128] and the shaft retention collar [138], respectively. This mechanism radially pilots the output shaft [128] in the side gear [136], permits relative rotation between the output shaft [128] and the side gear [136], and restrains the output shaft [128] within the carrier member 112. Each of the side gears [136] also includes a hub portion 150 having a plurality of axially outwardly extended coupling teeth 152 formed on an annular, axially outwardly facing surface 151 thereof. The coupling teeth 152 of the side gear [136] are circumferentially (or angularly) spaced from each other.

The drive axle assembly 110 according to the second exemplary embodiment of the present invention further includes a first clutch (or disconnect) assembly $160_1$ (as shown in FIGS. 8-10), provided for selectively drivingly disconnecting or connecting the first output shaft $128_1$ to or from the first side gear $136_1$, and a second clutch (or disconnect) assembly $160_2$ (as shown in FIG. 8), provided for selectively drivingly disconnecting or connecting the second output shaft $128_2$ to or from the second side gear $136_2$.

The first (right) and second (left) clutch assemblies $160_1$ and $160_2$ are substantially structurally identical, both structurally and functionally, therefore, in the interest of simplicity, the reference numeral [160] will be used when generically referring to both the first and second clutch assemblies $160_1$ and $160_2$ herein below, rather than reciting two different reference numerals.

The clutch assembly [160] includes a sliding clutch collar 162 (shown in detail in FIG. 11) and a substantially annular fluid-operated clutch actuator 164. The clutch collar 162 is disposed concentrically about the output shaft [128] and generally adjacent the inward end 131 of the output shaft [128]. Moreover, the clutch collar 162 is non-rotatably but slideably coupled to the output shaft [128], such as by a spline connection. Specifically, the clutch collar 162 includes female splines 163 which mate with complementary male splines 137 formed on the output shaft [128]. The mating female and male splines 163 and 137 permit relative axial motion between the clutch collar 162 and the output shaft [128] while inhibiting relative rotational motion therebetween. The clutch collar 162 further includes a plurality of axially inwardly extended coupling teeth 165 formed on an axially inwardly facing surface 167 thereof. The coupling teeth 165 of the clutch collar 162 are circumferentially (or angularly) spaced from each other, and are complementary to and engageable with the coupling teeth 152 of the side gear [136]. Also, the clutch collar 162 is formed with an annular groove 169 disposed about a periphery thereof.

The fluid-operated clutch actuator 164 is provided for axially driving the clutch collar 162. Preferably, the fluid-operated clutch actuator 164 is a pneumatic actuator and may operate on pressurized air or, preferably, a vacuum to provide linear travel of the clutch collar 162 between a first, engaged mode (FIG. 9) and a second, disengaged mode (FIG. 10). Actuators powered by hydraulic fluid, electricity or other means, which are axially drivable between the first and second modes are equally suitable for use with the instant invention. The vacuum-operated clutch actuator 164 includes a substantially annular actuator housing 130 defining a vacuum chamber 170 therein, and an annular spring-loaded actuator piston 166 slideably disposed within the actuator housing 130 for axially moving the clutch collar 162 and is secured to the actuator housing 130 through bellows 168 so as seal the vacuum chamber 170.

Each of the actuator housings 130 of the vacuum-operated clutch actuator 164 is rotatably mounted about the corresponding output axle shaft [128] coaxially therewith and is non-rotatably secured to the carrier member 112 within the corresponding trunnion [126], such as by press fitting, so as to close the opening 127 therein. Moreover, the annular actuator housing 130 is sealed within the corresponding pension [126] of the carrier member 112 by O-rings 131. On the other hand, the output axle shaft [128] rotatably supports the corresponding actuator housing 130 through an antifriction roller bearing 133, such as needle bearing. Therefore, the actuator housing 130 of the fluid-operated clutch actuator assembly 164 not only defines the vacuum chamber 170, but also acts (functions) as an end cap of the trunnion [126] closing the opening 127 therein. Accordingly, the fluid-operated clutch actuator assembly 164 including the actuator housing 130 as an integral part thereof defines an integrated fluid-operated actuator/end cap assembly.

Figure 12:
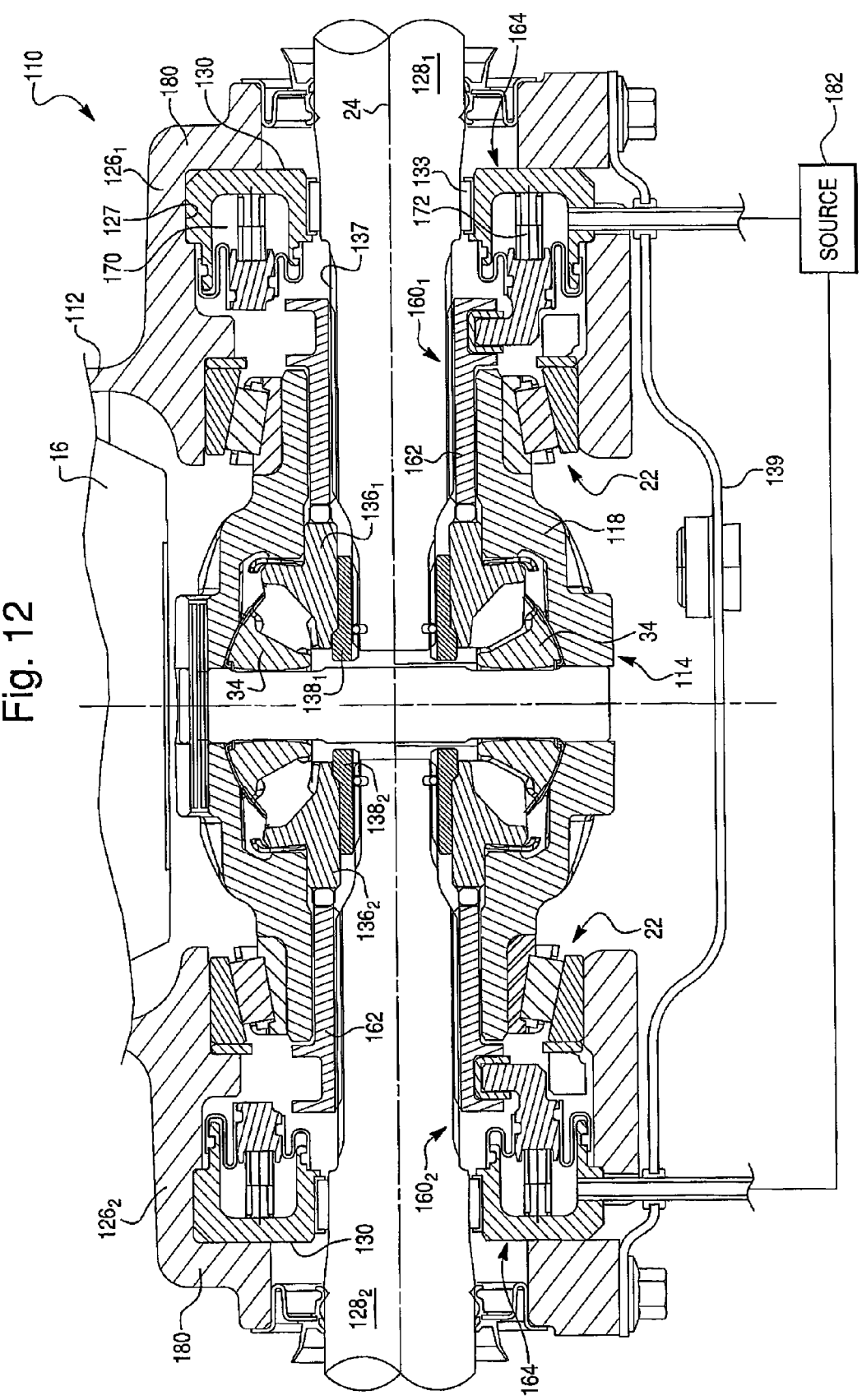
FIG. 12 is a cross-sectional view of the drive axle assembly showing an alternative structure of the differential carrier member according to the second exemplary embodiment of the present invention.

As further illustrated in FIGS. 8-10, an expandable snap ring, such as C-ring, 135 limits the axially outward travel of the actuator housing 130 so as to retain the actuator housing 130 within the corresponding trunnion [126] of the carrier member 112. Preferably, the snap ring 135 is disposed in an annular groove formed in the opening 127 of the trunnion [126]. Alternatively, as illustrated in FIG. 12, each of the trunnions $126_1$ and $126_2$ of the carrier member 112 can be provided with an annular flange 180 radially inwardly extending from a distal end of the trunnion $126_1$, $126_2$ substantially perpendicular to the central axis 24. In this case, the axially outward travel of the integrated fluid-operated actuator/end cap assembly 164 is limited by the annular flange 180 engaging the actuator housing 130. Moreover, the actuator housing 130 to axle shaft [128] sliding interface is sealed by a lip seal 190 non-rotatably mounted to the actuator housing 130.

The vacuum-operated clutch actuator 164 further includes a spring member 172 (such as a coil spring) disposed in the vacuum chamber 170 for normally biasing the actuator piston 166 towards the first, engaged mode of the clutch collar 162. The annular spring-loaded actuator piston 166 is provided with an actuator arm (or shift fork) 167 formed integrally with the actuator piston 166 to drivingly engage the annular groove 166 of the clutch collar 162 through a wear pad 183 for axially moving the clutch collar 162 into and out of driving engagement with the side gear [136]. Preferably, the actuator piston 166 and the actuator arm 167 are made homogeneously as a single part member. Further preferably, the wear pad 183 is fabricated from a polymer material and is secured within the groove 169 in the clutch collar 162 by any appropriate technique known in the art, such as by adhesive bonding. The actuator arm 167 is designed to mate with the groove 169 in the clutch collar 162.

The vacuum chamber 170 of the vacuum-operated clutch actuator 164 of the first and second clutch assemblies $160_1$ and $160_2$ communicates with a single, suitable external vacuum source 182 via fluid passages 184 and 185 formed through the carrier member 112 and the actuator housing 130, respectively, for connecting the vacuum-operated clutch actuator 164 to the external vacuum source 182, such as the engine manifold through a control valve (not shown). The integrated actuator/end cap assembly 164 communicates with the external vacuum source 182 through an external fitting 186.

Operation of the drive axle assembly 110 incorporating the disconnect assembly [160] according to the second exemplary embodiment of the present invention is best understood by reference to FIGS. 9 and 10.

When a vacuum is not applied in the vacuum chamber 170 of the vacuum-operated clutch actuator 164, the actuator piston 166 is shifted axially inward toward the side gear [136], as shown in the FIG. 9, by the coil spring 172. Consequently, the actuator arm 167 of the actuator piston 166 moves the clutch collar 162 so that the coupling teeth 165 of the clutch collar 162 mesh with (drivingly engage) the complementary coupling teeth 151 of the side gear [136], thus placing the disconnect assembly [160] in the first, engaged mode, as illustrated in FIG. 9. Those skilled in the art would appreciate that in the engaged mode of the disconnect assembly [160], the side gear [136] is drivingly coupled to the axle shaft [128] through the clutch collar 162. In this operational mode, torque can be transmitted from the side gear [136] to the output shaft [128] through the clutch collar 162.

Conversely, when a vacuum is applied in the vacuum chamber 170 of the vacuum-operated clutch actuator 164, the actuator piston 166 is shifted axially outward away from the side gear [136] against the biasing force of the coil spring 172. Consequently, the actuator arm 167 of the actuator piston 166 moves the clutch collar 162 so that the coupling teeth 165 of the clutch collar 162 disengage from the complementary coupling teeth 151 of the side gear [136], thus placing the disconnect mechanism [160] in the second, disengaged mode, as illustrated in FIG. 10. Those skilled in the art would appreciate that in the disengaged mode of the disconnect mechanism [160], the side gear [136] is drivingly disconnected from the output shaft [128]. In the disengaged mode, the output shaft [128] is rotationally independent lo from the side gear [136] and the other components of the differential assembly 114 and may freewheel independently of another output shaft [128]. Moreover, in the disconnect mode, the side gear [136] may be stationary while the output shaft [128] rotates due to tire rotation.

It should be noted that the changeover from the engaged mode to the disengaged mode of the output shaft [128] or vice versa is quickly and conveniently accomplished remotely by means of an appropriate control system associated with the vacuum-operated clutch actuator 164. The activating control for the vacuum-operated clutch actuator 164 may thus be located in a cab of the vehicle within the driver's reach.

Therefore, the present invention provides a novel axle shaft disconnect assembly for a drive axle of a motor vehicle that utilizes conventional casting and machining processes for a carrier member, a differential case, and an axle shaft, thus significantly reducing capital and tooling requirements to implement for production.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A drive axle assembly comprising:
 a carrier member including an outwardly extending trunnion having an opening therethrough;
 an output shaft axially outwardly extending from said carrier member through said opening in said trunnion;
 a differential assembly including a differential case supported for rotation within said carrier member and a side gear being rotatably mounted about said output shaft;
 a clutch collar disposed about said output shaft and non-rotatably coupled thereto and configured to selectively drivingly engage said side gear;
 an annular clutch actuator mounted to said trunnion for axially moving said clutch collar between a first position in which said clutch collar drivingly engages said side gear and a second position in which said clutch collar is disengaged from said side gear, wherein said annular clutch actuator is coaxially and non-rotatably secured within said trunnion of said carrier member;
 a shaft retention collar locked to said output shaft and frictionally engaged to said output shaft so as to restrain or prevent relative rotation between said shaft retention collar and said output shaft, and to ensure relative rotation between said side gear and said shaft retention collar; and an elastomeric O-ring disposed in an annular groove of said output shaft and compressed between said shaft retention collar and said output shaft to restrain or prevent relative rotation between said shaft retention collar and said output shaft, and to ensure relative rotation between said side gear and said shaft retention collar.

2. The drive axle assembly of claim 1, further comprising an expandable snap ring to lock said output shaft to said shaft retention collar.

3. The drive axle assembly as defined in claim 1 further comprising a drive sleeve rotatably mounted about said output shaft and non-rotatably coupled to said side gear; wherein said clutch collar configured to selectively drivingly engage said side gear through said drive sleeve.

4. The drive axle assembly as defined in claim 1, wherein said side gear has a plurality of axially outwardly directed coupling gear teeth, and wherein said clutch collar has axially inwardly directed coupling gear teeth complementary to said axially outwardly directed coupling gear teeth of said side gear.

5. The drive axle assembly as defined in claim 1, wherein said annular clutch actuator defines an end cap in said opening in said trunnion.

6. The drive axle assembly as defined in claim 1, wherein said annular clutch actuator includes an end cap non-rotatably secured to said trunnion and about said output shaft for covering said opening in said trunnion.

7. The drive axle assembly as defined in claim 1, wherein said drive axle assembly is an independent axle assembly.

8. The drive axle assembly as defined in claim 1, wherein said side gear has radially inwardly directed splines, wherein said clutch collar has radially inwardly directed splines, and wherein said drive sleeve has first radially outwardly directed splines complementary to said radially inwardly directed splines of said side gear at an inner end thereof and second radially outwardly directed splines complementary to said radially inwardly directed splines of said clutch collar at an outer end thereof.

9. The drive axle assembly as defined in claim 1, wherein said drive axle assembly is an independent axle assembly.

10. A drive axle assembly comprising:

a carrier member including an outwardly extending trunnion having an opening therethrough;

an output shaft axially outwardly extending from said carrier member through said opening in said trunnion;

a differential assembly including a differential case supported for rotation within said carrier member and a side gear being rotatably mounted about said output shaft;

a clutch collar disposed about said output shaft and non-rotatably coupled thereto and configured to selectively drivingly engage said side gear;

an annular clutch actuator mounted to said trunnion for axially moving said clutch collar between a first position in which said clutch collar drivingly engages said side gear and a second position in which said clutch collar is disengaged from said side gear, wherein said annular clutch actuator is coaxially and non-rotatably secured within said trunnion of said carrier member; and a shaft retention collar locked to said output shaft and frictionally engaged to said output shaft so as to restrain or prevent relative rotation between said shaft retention collar and said output shaft, and to ensure relative rotation between said side gear and said shaft retention collar; and an expandable snap ring mounted to said trunnion so as to retain an actuator housing within said carrier member;

wherein said clutch actuator is a fluid-operated clutch actuator including said annular actuator housing mounted to said trunnion coaxially therewith and defining a fluid chamber and an annular actuator piston provided for axially moving said clutch collar between said first position and said second position depending on a fluid pressure within said fluid chamber;

wherein said annular actuator housing of said first fluid-operated clutch actuator is non-rotatably secured within said trunnion of said carrier member so as to define an end cap covering said opening in said trunnion.

11. The drive axle assembly as defined in claim 10, further comprising an end cap non-rotatably secured to said trunnion and about said output shaft for covering said opening in said trunnion; said end cap defines said annular actuator housing of said fluid-operated clutch actuator.

12. The drive axle assembly as defined in claim 10, wherein said first fluid-operated clutch actuator includes a spring member normally biasing said actuator piston toward said first position.

13. The drive axle assembly as defined in claim 10, wherein said actuator piston of said fluid-operated clutch actuator includes an actuator arm formed integrally therewith for drivingly engaging said clutch collar.

\* \* \* \* \*